April 18, 1967 W. A. BEDFORD, JR 3,314,326
SELF-THREADING NUT WITH INTERRUPTED THREADS
Filed Oct. 20, 1964

*Inventor*
William A. Bedford, Jr.

United States Patent Office 3,314,326
Patented Apr. 18, 1967

3,314,326
SELF-THREADING NUT WITH
INTERRUPTED THREADS
William A. Bedford, Jr., Littleton, Colo., assignor to Republic Industrial Corporation, New York, N.Y., a corporation of Delaware
Filed Oct. 20, 1964, Ser. No. 405,033
2 Claims. (Cl. 85—32)

This invention relates generally to nuts, and has particular reference to a self threading nut which is adapted for assembly onto an unthreaded stud.

Several forms of thread cutting nuts have been proposed, and some have found considerable use in securing die cast name plates, ornamentation, indicia, and the like to steel panels of automobiles and appliances. Such die cast devices are provided with integral rearwardly projecting studs to extend through the support panel and receive a fastener. Since name plates or ornaments are often chromium plated, which provides an extremely hard outer surface it has been found difficult to provide a fastener capable of biting into the stud surface with sufficient strength to securely retain the device in the panel.

One type of thread cutting fasteners which has been used for this purpose is formed of sheet metal, suitably hardened, having a central elongated aperture, bounded by helical edge portions. As the device is rotated onto a die cast stud, the edges crush or impress a pair of helical threads into the surface of the stud as the fastener moves down the stud.

Such devices are subject to a number of disadvantages which have made them unsatisfactory for any but the lightest service. In assembly line operations, nuts are usually assembled with power tools, set to drive to a definite torque. The assembly of the above described type of sheet metal nut is made difficult by the fact that the maximum permissible seating torque (above which the threads are stripped) is only slightly above the driving torque. For example, a nut of this type designed for use with a ¼ inch stud, may have a 15 inch pound driving torque and an 18 to 20 inch pound stripping torque when the nut seats. This difference is difficult to control with power nut drivers, and in fact is difficult to read on a torque wrench. A nut driven slightly above the seating torque will strip the threads formed, resulting in a circumferential groove around the stud, and a loose attachment. Since it is impossible to repair the stud the name plate must be replaced.

One possible reason for the low stripping torque of such devices may be the fact that only a single nut thread is traveling in each thread groove, and by the time each nut thread has cut a thread all the way down the stud, it has worn considerably, so that the threads at the bottom of the stud, where they are most needed actually have the least holding power.

Another possible reason for the inadequate difference between driving torque and stripping torque with such fasteners may be the fact that the stud is engaged by the sides of the elongated aperture, so that the greatest stress occurs across the weakest dimension of the device. Since the nut is formed of a single thickness of sheet metal, the thread forming edges cannot grip the stud with sufficient strength to form adequate threads.

Another disadvantage of such nuts has been the fact that the double thread formed in the stud by the assembly of the thread cutting fastener therein is unsuitable for receiving a nut having a standard thread.

Hence if the sheet metal nut must ever be removed, or if it is damaged or lost, a repairman cannot use a standard nut as a replacement.

The assembly of such nuts is further complicated by the fact that they must be started onto the stud nearly exactly in axial alignment with the stud. If a nut is started onto a stud at an improper angle to the axis of the stud, the shape of the center hole, as seen by the stud, is unsuitable for proper engagement with the stud, which causes unsatisfactory engagement between the thread-cutting edges and the stud, resulting in a loose attachment.

Another disadvantage of this type of nut is the cost, which results both from the fact that the nut must be made of high carbon steel, and the careful heat treatment that it must receive to provide the proper hardness and temper without decarbonization of the cutting edges.

The object of this invention is to provide a thread cutting nut which avoids the above disadvantages, in that it has a stripping torque greatly in excess of the driving torque, can be properly assembled even if started in misalignment, can be made of low carbon steel, and does not require any heat treatment. Certain embodiments of the invention also provide a nut which has more than a single thread in engagement with opposite portions of the stud, and forms on the stud a single thread which is capable of receiving a standard nut.

Other objects of the invention will be obvious to one skilled in the art from the following detailed description of a specific embodiment thereof.

Figure 1:
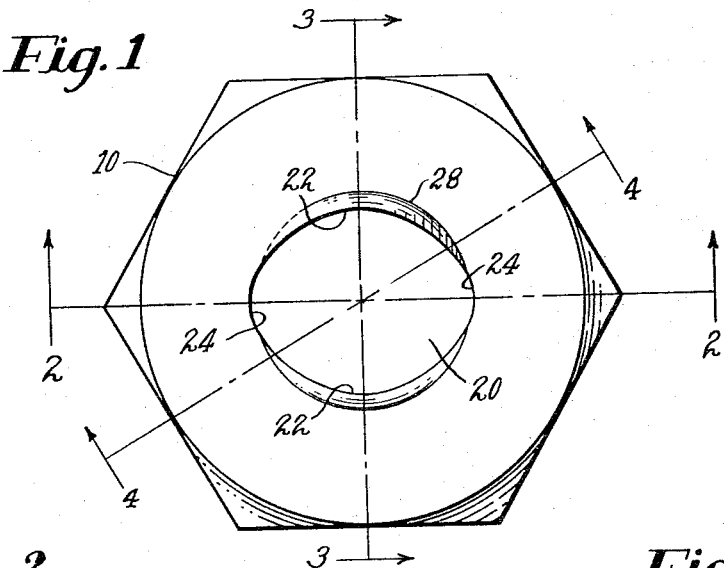
FIG. 1 is a top plan view of a nut embodying the features of the invention.
Figure 2:
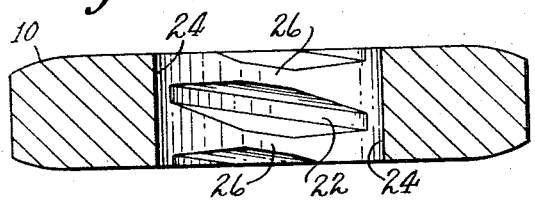
FIG. 2 is a view taken on line 2—2 of FIG. 1.
Figure 3:
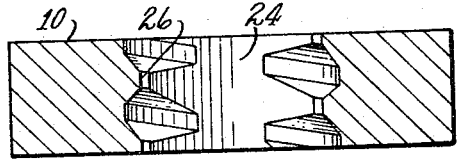
FIG. 3 is a view taken on line 3—3 of FIG. 1.

Referring to the drawing, there is illustrated a nut 10, which is particularly adapted for assembly onto an unthreaded stud 12 of a die-cast article 14 such as a name plate, ornament, or the like, to secure the name plate to a panel 16.

The article 14 may be chromium plated for reasons of appearance, and to avoid the labor involved in utilizing special masking fixtures, the studs 12 also are chromium plated. To facilitate assembly of the nut as will appear hereinafter, the outer end of the stud may have a tapered portion 18.

In the illustrated embodiment the nut blank is formed of SAE 1010 steel ⅞₄″ thick with a standard hexagonal periphery.

Centrally disposed in the blank is a generally elliptical aperature 20 which therefore is elongated in one dimension. The aperture wall is threaded in a manner to appear hereinafter to provide a pair of opposing portions 22 which are threaded, and a pair of unthreaded opposing portions 24, disposed at the ends of the elongated aperture 20 and generally 90° from the threaded portions 22.

The threads 26 formed in the portions 22 curve gradually at the crest from the surface of the aperture wall at the ends of the elongated opening and reach a maximum height at the center of the portions 22.

The illustrated nut may be readily produced in standard nut manufacturing machinery by blanking out from stock of the desired nut thickness, a nut blank of the desired peripheral shape, and punching in the blank the center opening having a shape corresponding to that shown by the full line in FIG. 1 designating the nut aperture.

Figure 4:
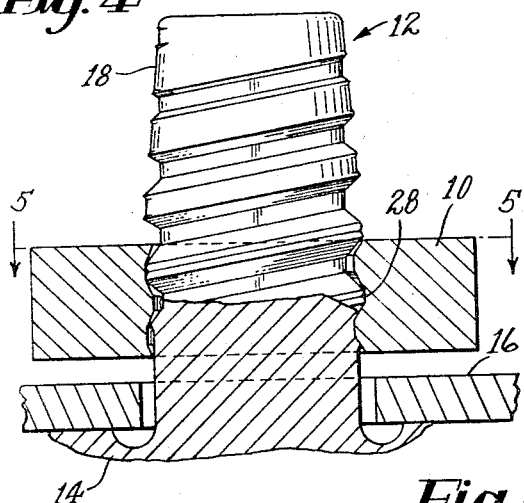
FIG. 4 is a view in side elevation, partly in section, of the nut of FIG. 1, assembled onto a previously unthreaded stud with the nut being shown in a section taken on line 4—4 of FIG. 1.
Figure 5:
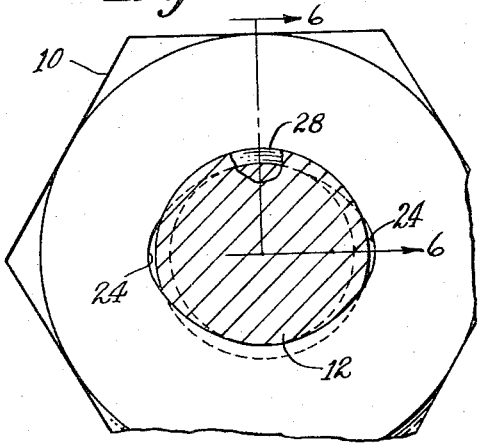
FIG. 5 is a view in section taken on line 5—5 of FIG. 4.
Figure 6:
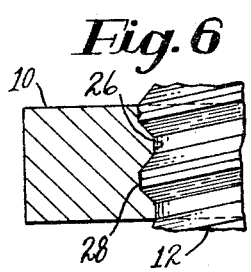
FIG. 6 is a view in section taken on line 6—6 of FIG. 5.

The nut blank may then be threaded by rotating a standard tapping die through the aperture. The tapping die is of a predetermined size in relation to the size of the opening such that substantially full threads are formed in the center of the wall portions 22, but no threads are formed in the end portion 24 of the wall. The threads so formed lie at the root on a helix in common as represented in FIG. 4 and by the dotted line designated 28 in FIG. 1 and FIG. 5, and the threads in one major wall portion 22 are offset by ½ the thread pitch from the threads in the opposite major wall portion 22.

Although material from which the nut is made may be of any desired thickness, it is considered advisable that it be sufficiently thick that at least two thread segments are formed in each portion 22.

The nut 10 may be readily assembled onto the stud 14 by placing it on the tapered end and rotating with a suitable tool so that the threads of the nut bite into the surface of the stud, and to cause the nut to progress down the stud.

The gradual increase in the height of the threads from the minor end portions 24 of the aperture wall effects a gradual increase in crushing force against the surface of the stud to swage the stud surface into a thread form matching that of the nut.

In the illustrated embodiment the original diameter of the stud (except for the tapered end) is greater than the distance between the thread crests at the center of the portions 22 but less than the distance between the thread roots at the same point. (See FIG. 4.) As the nut is rotated down the stud the swaging action of the nut threads against the surface of the stud causes the displaced metal to rise up between the threads of the nut. The thread 28 formed on the stud is thereby the result of both inward and outward movement of the metal of the stud surface. The working thus imparted to the stud surface provides threads of greater strength than would result from the forming of threads by cutting to remove metal. Hence when the nut seats against the panel, the threads formed in the sud have sufficient strength to withstand a substantial amount of torque in excess of driving torque, to permit adequate tightening of the nut against the panel. The provision of multiple threads on each side of the nut is believed to contribute materially to the stripping torque, since although the leading thread may be worn down by the swaging of the thread in the stud, the remaining threads will be relatively unaffected, and will be available for resisting the force of tightening the nut against the panel.

During driving and tightening of the nut, the strength of the nut body, resulting from the fact that the width of the threads is appreciably less than the width of the nut, prevents any appreciable amount of circumferential expansion which would result in insufficient pressure against the stud to properly impress the threads therein.

The nut, when being started onto the stud, can tolerate a greater amount of angular misalignment than previously known sheet metal nuts, due to the nut thickness and the fact that more than one thread on each side engages the stud, which causes the nut to align itself with the axis of the stud as the threads begin to bite into the stud surface.

Another advantage of the above described embodiment of the invention is the fact that the nut forms only a single thread in the stud, which thread matches that of the tapping die with which the nut threads are formed. Hence if, for any reason the nut is lost, a standard nut having a proper thread size and pitch may be screwed onto the stud. Since the threads of the stud were swaged directly from the nut, a standard nut assembled thereafter onto the stud will not have the usual clearance, so that friction lock effect will also be obtained with the replacement nut.

In the illustrated embodiment the threads formed in the portions 22 are symmetrical, that is, both the leading and trailing ends of the threads merge gradually with the wall of the opening near the end portions 24 so that the nut may be started onto the stud with either side toward the panel. In some cases, however, it may be desirable to shape the opening so that the height of the trailing end of the threads is the same as that of the medial portion, to provide a greater length of thread mating with the threads formed in the stud.

In the illustrated embodiment, the nut is preferably not heat treated, but may be used in the unhardened condition. Although heat treated nuts may be required for use on studs of hard material, it has been found that on die cast studs, an unheat-treated nut actually forms better threads than a carburized and hardened nut. It is suspected that this may be due to the fact that burrs and other imperfections on the threads of the hardened nut tear away metal during assembly, whereas the unhardened nut, such imperfections are smoothed off as the nut is rotated onto the stud.

Although in the illustrated embodiment the nut is formed with the two threaded portions, it will be apparent that nuts may be provided with an opening of suitable shape to provide three or more threaded portions, provided that the threads formed rise gradually from the wall of the opening to impart the previously described swaging action.

Since certain other obvious changes may be made in the illustrated embodiment without departing from the scope of the invention, it is intended that all matter contained herein be interpreted in an illustrative and not in a limiting sense.

What is claimed is:

1. A self-threading nut for assembly onto a taper ended unthreaded stud of appropriate size, said nut having an oblong aperture having a major axis and a minor axis, the wall of said aperture defining from the intersections of said aperture wall and said minor axis smoothly progressing curves substantially meeting at said intersections of said aperture wall and said major axis, said aperture wall having opposed minor substantially unthreaded end portions at said intersections of said major axis and said aperture wall and opposed major threaded portions at said intersections of said minor axis and said aperture wall intermediate said minor substantially unthreaded wall end portions, said major threaded wall portions having a thread in common and each including a plurality of thread convolution segments rising therefrom, the root of said thread lying on a helix which intersects the crest of said thread at ends of said segments in proximity to said intersections of said major axis of said aperture and said aperture wall, said ends of each of said segments being spaced apart less than 180° whereby the points of intersection of said aperture wall and said root are substantially nearer to said intersections of said major axis and said aperture wall than to said intersections of said minor axis and said aperture wall, said root having maximum depth at the approximate centers of said segments longitudinally between said ends of the segments, the crest of said thread curving longitudinally inwardly toward said root from each of said minor substantially unthreaded wall end portions to the other of said minor substantially unthreaded wall end portions and to the level of said root at said ends of said segment, and the depth of said root progressively diminishing similarly in said thread segments and in each of opposite directions from each of said approximate centers of said thread segments to zero at said ends of said segments, whereby a taper ended unthreaded stud of appropriate size brought into contact relatively rotationally at the tapered end thereof with said curved crest in said aperture is swaged on a helix generated by said thread and is subjected to bite of said curved crest progressively from about the level of said thread root.

2. A self-threading nut for assembly onto a taper ended unthreaded stud of appropriate size, said nut having a generally elliptical aperture having a major axis and a minor axis, the wall of said aperture having opposed minor substantially unthreaded end portions at the intersections of said major axis and said aperture wall and opposed major threaded portions at the intersections of said minor axis and said aperture wall intermediate said minor substantially unthreaded wall end portions, said major threaded wall portions having a thread in common and each including a plurality of thread convolution segments rising therefrom, the root of said thread lying on a circular helix and the crest of said thread lying on the generally elliptical surface of said aperture wall which intersects with the ends of each of said segments in proximity to said intersections of the major axis of said aperture and said minor substantially unthreaded wall end portions, said ends of each of said segments being spaced apart less than 180° whereby the points of intersection of said generally elliptical wall and said root are substantially nearer to said intersections of said major axis and said aperture wall than to said intersections of said minor axis and said aperture wall, and said root having maximum depth in said major threaded wall portions at points appearing in plan of the nut to be substantially on the minor axis of said aperture, said crest of said thread curving longitudinally inwardly toward said root from each of said minor substantially unthreaded wall end portions to the other of said minor substantially unthreaded wall end portions and to the level of said root at said ends of said segments, and the depth of said root progressively diminishing similarly in said thread segments and in each of opposite directions from each of said points of maximum depth to zero at said ends of the segments, whereby a taper ended unthreaded stud of appropriate size brought into contact relatively rotationally at the tapered end thereof with said curved crest in said aperture is swaged on a helix generated by said thread and is subjected to bite of said curved crest progressively from about the level of said thread root.

References Cited by the Examiner

UNITED STATES PATENTS

| | | |
|---|---|---|
| 328,139 | 10/1885 | Patten. |
| 1,666,162 | 4/1928 | Bostaph _____ 10—111 |
| 2,167,176 | 7/1939 | Grassberger. |
| 2,983,180 | 5/1961 | Sygnator. |
| 3,006,003 | 10/1961 | Johnson. |
| 3,157,215 | 11/1964 | Zahodiakin _____ 85—33 |

CARL W. TOMLIN, *Primary Examiner.*

EDWARD C. ALLEN, M. PARSONS, JR.,
*Assistant Examiners.*